United States Patent [19]
Clarke

[11] Patent Number: 5,126,218
[45] Date of Patent: Jun. 30, 1992

[54] CONDUCTIVE CERAMIC SUBSTRATE FOR BATTERIES

[76] Inventor: Robert L. Clarke, 74 Muth Dr., Orinda, Calif. 94563

[21] Appl. No.: 593,327

[22] Filed: Oct. 2, 1990

Related U.S. Application Data

[63] Continuation of Ser. No. 430,904, Oct. 31, 1989, abandoned, which is a continuation of Ser. No. 726,045, Apr. 23, 1985, abandoned.

[51] Int. Cl.[5] .................... H01M 4/66; H01M 4/68
[52] U.S. Cl. .................................................. 429/245
[58] Field of Search .................... 429/228, 233, 245

[56] References Cited

U.S. PATENT DOCUMENTS

| | | | |
|---|---|---|---|
| 1,307,407 | 6/1919 | Majima . | |
| 1,687,752 | 10/1928 | Ellery . | |
| 2,625,574 | 1/1953 | Fuller . | |
| 2,985,701 | 5/1961 | Brennan . | |
| 3,016,413 | 1/1962 | Di Pasquale et al. . | |
| 3,486,940 | 12/1969 | Ruben | 136/26 |
| 3,499,795 | 3/1970 | Ruben | 136/24 |
| 3,516,863 | 6/1970 | Willmann et al. | 136/58 |
| 3,516,864 | 6/1970 | William | 136/58 |
| 3,576,674 | 4/1971 | Ruben | 136/26 |
| 3,615,832 | 10/1971 | Ruben | 136/26 |
| 3,621,543 | 11/1971 | Willmann et al. | 29/2 |
| 3,661,644 | 5/1972 | Arrance | 136/6 |
| 4,098,967 | 7/1978 | Biddick et al. | 429/210 |
| 4,206,269 | 6/1980 | Putt et al. | 429/15 |
| 4,289,835 | 9/1981 | Lee et al. | 429/50 |
| 4,400,449 | 8/1983 | Henk | 429/59 |
| 4,422,917 | 12/1983 | Hayfield | 204/196 |
| 4,473,625 | 9/1984 | Watakabe et al. | 429/105 |
| 4,507,372 | 3/1985 | Rowlette | 429/228 |
| 4,510,219 | 4/1985 | Rowlette | 429/212 |

OTHER PUBLICATIONS

Electrochemical Properties of a New Electrode Material, $Ti_4O_7$, R. J. Pollock et al., "Lead 68", Lead Development Association Paper, 1969.
Ebonex Technical Brochure: A New Electrochemical Material with the Corrosion Resistance of a Ceramic and the Electrical Conductivity of a Metal.
"Lambertville Adds Ebonex to Product Line", Ceramic Industry, Mar. 1985.
Predicasts Technology Update, vol. 41, No. 8, Mar. 4, 1985.

*Primary Examiner*—John F. Niebling
*Assistant Examiner*—Steven P. Marquis
*Attorney, Agent, or Firm*—Cushman, Darby & Cushman

[57] ABSTRACT

An improved substrate for battery sustems is disclosed. The substrate is a conductive ceramic formed from a sub-stiochemetric titanium dioxide material. The material preferably is $TiO_x$, where x is in the region of 1.55 to 1.95. Methods of manufacture are disclosed as well as configurations for battery elements.

9 Claims, 2 Drawing Sheets

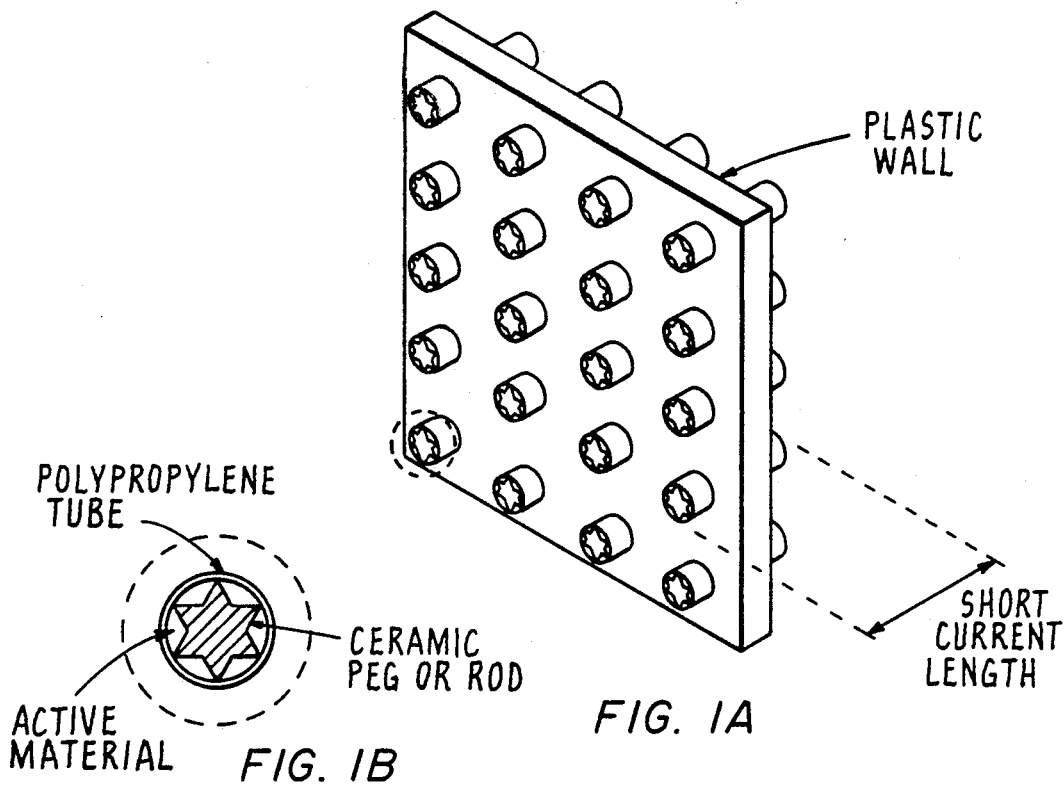
FIG. 1A
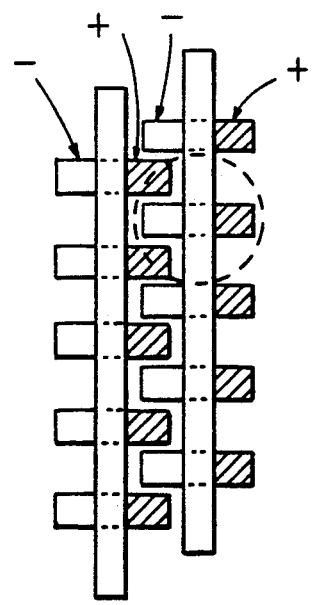
FIG. 1B
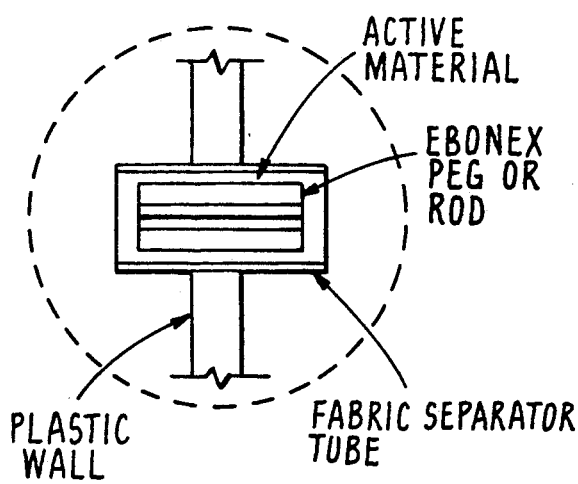
BIPOLAR CONFIGURATION
FIG. 1C
FIG. 1D

MONOPOLAR CONFIGURATION

CONDUCTIVE CERAMIC SUBSTRATE FOR BATTERIES

This is a continuation of application Ser. No. 07/430,904, filed on Oct. 31, 1989, now abandoned, which is a continuation of application Ser. No. 06/726,045, filed Apr. 23, 1985, both now abandoned.

FIELD OF THE INVENTION

This invention relates to the incorporation of a conductive ceramic based on sub-stoichiometric titanium oxide into battery systems that use conventional metallic conductor and supports. More particularly the invention relates to the use in batteries of a substrate material comprising titanium dioxide, $TiO_x$, where x is in the region of 1.55 to 1.95.

BACKGROUND OF THE INVENTION

It has been a goal of battery engineers and scientists to provide lighter weight and more reliable battery systems, by selection of corrosion resistant materials, active electrochemical couples and combining them in a well engineered system. The goals are often incompatible, as the failure of the materials of construction often frustrate the aims.

Typical examples of the material problems associated with high energy battery systems are the failure of the separator/electrolyte matrix used in the sodium sulfur battery, and the severe corrosion problems experienced in the carbon anode of the zinc bromine battery systems. This causes both systems to be late in development.

Such problems have been evident in the lead acid battery and has concerned the industry for many years. Corrosion of the lead/lead alloy substrates is the major failure mode in the lead acid battery. As a result, the amount of lead used in the lead grid support is much higher than required from an electrical or electrochemical standpoint. Further, additional metal is included to offset the continual attack of the positive grid during charging of the battery. Larger amounts of lead are also used to offset the poor mechanical characteristics of lead as a support structure.

It is well known among those skilled in the art of lead acid battery manufacture that the most vulnerable item in the construction of a battery is the positive battery plate. This is due to the persistent corrosion of the lead/lead alloy grid during the recharge of the system as shown in the following equation (1).

At the positive electrode

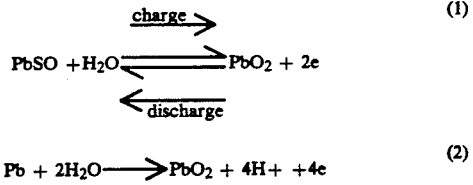

$$PbSO + H_2O \underset{discharge}{\overset{charge}{\rightleftharpoons}} PbO_2 + 2e \quad (1)$$

$$Pb + 2H_2O \longrightarrow PbO_2 + 4H+ +4e \quad (2)$$

Naturally the exposed lead grid will oxidize to lead dioxide also, see equation (2). As the grid ages it suffers stress corrosion, creep and electrochemical attack. Stress corrosion in particular accelerates the failure of the lead grid, and therefore the grid is made from much thicker cross section than is necessary from electrical conductivity considerations, in order to prevent premature failure.

In the prior art various attempts have been made to overcome this problem, for example, plastic frames coated with lead to act as the electrical conductor and to provide a chemically compatible surface have been suggested, see U.S. Pat. No. 3,607,421.

Other attempts included the use of lead coated titanium mesh, the use of oxide dispersion hardened lead, instead of the fault prone lead alloys. Other attempts have used techniques such as the incorporation of glass fiber and carbon fiber composites to strengthen the structure against creep and stress corrosion.

All the attempts have had one common purpose, to improve the performance of the positive plate of the lead acid battery. Many attempts have been directed at efforts to reduce the corrosion of the grid that holds the active material of the battery in the electrolyte, to thus reduce the amount, and therefore weight, of the lead required to do a specific duty.

None of the above techniques are believed to be a total success. The high oxygen overpotential required to recharge lead sulfate severely limits the material choices the electrochemist or metallurgist can make in this system.

SUMMARY OF THE PRESENT INVENTION

The foregoing problems now have a reasonable solution since the discovery to the material described in U.S. Pat. No. 4,422,917, issued to Peter C. S. Hayfield for "Electrode Material, Electrode and Electrochemical Cell". The material described in that patent has a conductivity equal to carbon, a well tried electrode material, however it also has the required high oxygen overpotential, well in excess of lead, which is approximately 1.7 volts. With respect to the Standard Hydrogen Electrode, the sub-stoichiometric titanium dioxide material evolves oxygen at 2.92 volts, and it can be demonstrated that lead and lead sulfate can be oxidized to lead dioxide when the sub-stoichiometric titanium dioxide material is used as the substrate, for these active materials. Carbon and platinum, two alternative active substrate materials, have overvoltages in the range of 1.46 to 1.27 volts, respectively, too low for the charging process to take place. That is, oxygen is evolved rather than the conversion of lead or lead sulfate to lead dioxide and consequently the electrode does not become charged up efficiently.

The ceramic used in accord with the present invention is extremely resistant to corrosion and attack by hydrogen, both of which could occur during cell reversal, or if the substrate was used as a cathode. The material has been used successfully as a cathode in acid solutions and it may be easily plated and anodically stripped unharmed, a quality almost unique in electrode technology.

The ability to act as a cathode allows the successful use of the material as the cathode plate in the lead acid battery. This provides a reduction in weight similar to the anode case. Lead has a density of 11.34, whereas the material of the present invention has a density in the range of 3.5 to 4.0 depending upon the method of manufacture. Further, it is possible to produce a honeycomb structure of the present material of an even lower density.

OBJECTS OF THE PRESENT INVENTION

It is the object of the present invention to provide a ceramic material having dimensional stability, resistance to stress, and the freedom from galvanic corrosion for use in batteries. The material of the present invention may be manufactured in a diversity of shapes g and can be formed in the clay state.

A further object of the present invention in accord with the foregoing object is a material that is resistant to anodic and cathodic attack. The material may therefore be used as a bipolar substrate, and a practical bipolar lead acid battery is possible that will withstand many reversals without failure.

Another object in accord with the preceding objects is a bipolar battery system where the battery element or plate has an anode on one side and a cathode on the other side, with a common substrate which is either a single substance or a composite made up of a combination of materials. In this case the additive could be included into the lithium oxide powders prior to processing, or added to the powder to form a thin coating.

A still further object of the present invention in accord with the preceding objects is a substrate material that may be used in a soluble lead salt system.

Further objects and features of the present invention will be readily apparent to those skilled in the art from the following specification and drawings illustrating preferred embodiments.

BRIEF DESCRIPTION OF THE DRAWINGS

FIG. 1a is a perspective view of a wall member incorporating the elements of the present invention for use within an electrochemical battery.

FIG. 1b is a cross-sectional view of a fabricated cell element as contemplated by the present invention.

FIG. 1c is sectional representation of a bipolar configuration of wall elements incorporating cell elements of the present invention.

FIG. 1d is an enlarged view in cross-section of the portion of FIG. 1c enclosed in dotted circle d.

FIG. 2b is horizontal sectional representation of the monopolar configuration using conventional lead grids of FIG. 2a.

DETAILED DESCRIPTION OF THE INVENTION

The substrate material formed of the sub-stoichiometric titanium dioxide material described herein is a solid homogenous substrate which does not exhibit the above mentioned problems, its properties are associated with the bulk material, which has very high stability, during reversed electrochemical cycles.

The shape and fabrication techniques used by the battery industry have been formulated to deal with the problems associated with lead and lead alloys. The use of the material of the present invention frees the user from those constraints, however such is the versatility of the material that direct replacement of the conventional grid or rod structure of the conventional lead electrodes in a lead acid battery is feasible. The titanium suboxide described above can be made as a solid ceramic or as a powder that may be used to make a conductive thick film or alternatively a conductive paint. Further opportunities include forming tubes and rods by extrusion techniques while the material is in the clay state, and prior to processing.

One example of the use of these possibilities as contemplated by the present invention is shown in FIG. 1 a, b, c and d. In this case the ceramic is extruded as a star shaped pin, that is molded into a plastic wall made of a material such as polypropylene. A battery paste or powder is applied and held in place with a porous fabric separator tube as shown in FIG. 1b. The bipolar units are assembled as shown in FIG. 1c where five bipolar plates are shown. Two half end plates would be required to make a twelve volt battery.

A second example of the possibilities as contemplated by the present invention is shown in FIG. 2 a, b, c, and d. The conventional lead grid of FIG. 2a which is usually assembled in a monopolar configuration is shown in FIG. 2b may be replaced with a ceramic plate where the surface is made receptive to the binding of active material by cutting or casting grooves into the surface to form the configuration of FIG. 2d. Paste is then applied to substantially cover the surface of the ceramic plate as is done in the case of the conventional lead plate of FIG. 2a.

Figure 2C:
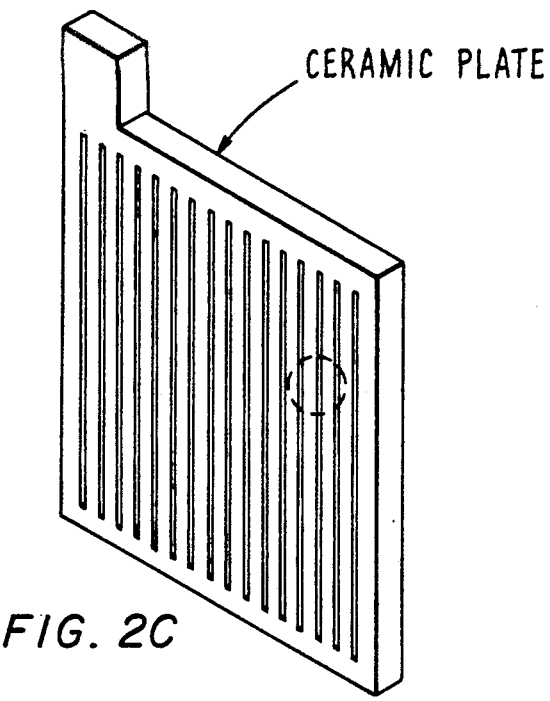
FIG. 2c is a perspective view of a ceramic plate as contemplated by the present invention.
Figure 2D:
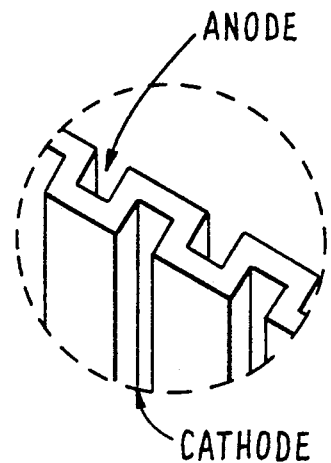
FIG. 2d is an enlarged perspective cross-sectional view of the ceramic plate of FIG. 2c.
Figure 2A:
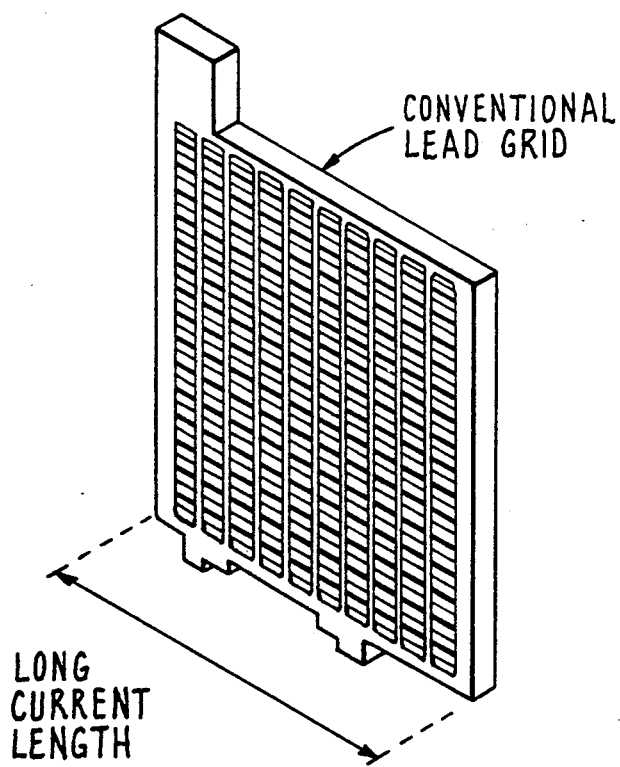
FIG. 2a is perspective view of a lead grid of a conventional lead acid battery.
Figure 2B:
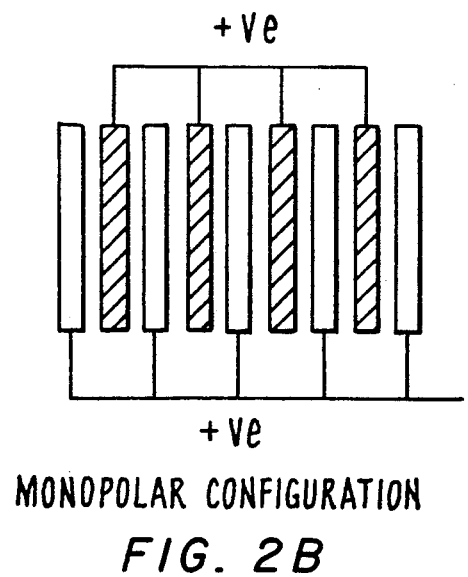

The substrate material of the present invention and of the type represented by the forms shown in FIG. 1a and FIG. 2c has been manufactured and tested in accord with the following examples:

EXAMPLE 1

Solid plates of the material of the present invention, made according to the technique described in U.S. Pat. No. 4,422,917, were cut to strips measuring $4 \times 0.5 \times 0.25$ inches. Five 0.25 inch holes were cut through the plates. A paste of lead oxide, lead powder, and 40% sulfuric acid was prepared, and pasted into the cavities to simulate the pasting of a typical lead acid grid. The paste was allowed to cure g over a few days in a damp atmosphere. The product, a simulated pasted plate was charged in 20% sulfuric acid. A current of 0.5 amperes was passed for a few hours to form black lead dioxide in the anode cavities, and a grey lead sponge in the cathode plates. These first lead acid ceramic plates, produced an open circuit voltage of 2.2 volts in the charged state, and could be discharged in the same way as a lead acid battery.

EXAMPLE 2

In a second experiment, the substrate plates of the material of the present invention were cut with grooves and pasted on both sides. The two active material pastes were separated physically by the substrate plate. The plates were plated with pure lead in a lead fluoroborate plating bath at 40° C., until they were covered with a coherent grey deposit of lead. These plates were then pasted with the battery paste described in EXAMPLE 1 and allowed to cure. The plates were charged in 20% sulfuric acid to form charged bipolar plates, lead on one side and lead dioxide on the other. After a series of charge and discharge cycles deep enough to penetrate the lead coating the lead oxide materials were removed with acetic acid, hydrazine sulfate mixtures. The substrate materials were recovered and examined. There was no evidence of corrosion.

EXAMPLE 3

In a third experiment to prove the feasibility of the ceramic substrate in the soluble lead couple case, plates of the material of the present invention $4 \times 2 \times .025$ inches were cut. Two plates were made anode and cathode in 40% lead fluoroborate solution at 40° C. in a magnetically stirred bath. A current of 0.5 amperes was passed for three hours to produce a coherent deposit of lead dioxide on the anode and grey lead on the cathode. These materials could be electrochemically discharged, as a conventional lead acid couple, and recharged without damage to the substrate plates.

The substrate material of the present invention permits the user to depart from the constraints of conventional lead acid battery manufacture. The substrate material of the present invention makes possible the use of soluble lead salts as opposed to the conventional lead sulfuric acid system used today. Lead is attacked by acetic acid, nitric acid, fluoroboric acid, perchloric acid and any acid that forms soluble lead salts. This limits the couple, to having the active material in the charged or discharged state associated with the grid material at all times. The capacity of the battery is therefore always constrained by the size and weight of the electrode pack.

If the active material was soluble in the electrolyte the capacity of the battery would be a function of the size of the electrolyte tanks and the electrode gap engineered in the design.

With the substrate of the present invention, unlike lead or special lead alloys, platinized titanium or similar materials can be used with any soluble lead salt without damage. Further, it has been demonstrated that both lead dioxide and lead can be electrochemically cycled onto the substrate of the present invention, where it forms a coherent deposit, that is highly active electrochemically. This property of the substrate of the present invention provides the means to design standby and load leveling batteries that use the excellent characteristics of the lead acid couple providing high cell voltage and low temperature operation.

The inclusion of the substrate material of the present invention into the design of secondary batteries will provide a means to upgrade the performance of many systems and types. In particular, the reduction in weight, resistance to corrosion, and the ability to use more reactive couples will advance the art of battery manufacture and provide a bridge between established systems such as the lead acid and the advanced high energy systems, such as the lithium/thiosulfate systems currently being developed.

Another important advantage provided by the substrate material of the present invention in the lead acid system is the high oxygen and hydrogen overvoltages provided by this substrate material. The material will act in the same way as the calcium lead alloys used in modern sealed lead acid systems. Lead calcium, like the substrate material of the present invention, has overvoltages higher than the recharge voltages of the lead antimony alloys widely used in commercial lead acid systems. The use of calcium lead alloys provides the extra millivolts of overvoltage such that the charging circuit can be set to cut off the charging current at the gas evolving voltages, and thus prevent the build up of hydrogen and oxygen in the battery case. With this built-in provision the battery can be sealed safely.

While certain preferred embodiments and applications of the present invention have been specifically disclosed, it should be understood that the invention is not limited thereto as many variations will be readily apparent to those skilled in the art and the invention is to be given it broadest possible interpretation within the terms of the following claims.

I claim:

1. A secondary lead-acid battery comprising an active material support member, said support member including a titanium suboxide electrode material having the formula $TiO_x$, where $x = 1.55$ to $1.95$, an active material paste comprising lead oxide, lead sulfate and sulfuric acid in contact with said titanium suboxide electrode, and an electrolyte comprising sulfuric acid.

2. A battery as in claim 1 wherein said titanium suboxide electrode material is in the form of a solid ceramic.

3. A battery as in claim 1 wherein said titanium oxide is in the form of a powder.

4. A battery as in claim 1 wherein said electrode material is in the form of a conductive paint.

5. A battery as in claim 1 wherein said electrode material is in the form of a conductive paint.

6. A battery as in claim 2 wherein said support member comprises a plastic wall and wherein said titanium suboxide electrode material is in the form of pins passing through said wall such that said pins are exposed on each end.

7. A battery as in claim 2 wherein said support member consists of said titanium oxide electrode material.

8. A battery as in claim 7 wherein said titanium oxide is in the form of a plate.

9. A battery as in claim 1 further comprising a case for containing said support and electrolyte, wherein said case is sealed.

* * * * *